(12) United States Patent
Pesonen et al.

(10) Patent No.: US 9,727,583 B2
(45) Date of Patent: Aug. 8, 2017

(54) INTERACTIVE PHYSICAL DISPLAY

(71) Applicant: Rovio Entertainment Ltd, Espoo (FI)

(72) Inventors: Mika Pesonen, Espoo (FI); Johannes Rajala, Espoo (FI)

(73) Assignee: ROVIO ENTERTAINMENT LTD, Espoo (FI)

( * ) Notice: Subject to any disclaimer, the term of this patent is extended or adjusted under 35 U.S.C. 154(b) by 153 days.

(21) Appl. No.: 14/340,596

(22) Filed: Jul. 25, 2014

(65) Prior Publication Data

US 2016/0026657 A1    Jan. 28, 2016

(51) Int. Cl.
*G06F 17/30* (2006.01)
*H04W 4/18* (2009.01)

(52) U.S. Cl.
CPC .. *G06F 17/30268* (2013.01); *G06F 17/30247* (2013.01); *H04W 4/185* (2013.01)

(58) Field of Classification Search
CPC ........ G06F 17/30247; G06F 17/30268; H04M 1/72544; H04M 1/72572; H04W 4/185
See application file for complete search history.

(56) References Cited

U.S. PATENT DOCUMENTS

| | | | |
|---|---|---|---|
| 5,714,972 A | 2/1998 | Tanaka et al. | |
| 6,167,439 A * | 12/2000 | Levine ................. | G06F 3/0483 358/408 |
| 6,792,398 B1 * | 9/2004 | Handley ................ | G06F 3/016 345/419 |
| 8,513,546 B2 * | 8/2013 | Wei ....................... | G06F 3/0321 178/18.01 |
| 9,164,975 B2 * | 10/2015 | Milewski ............... | G06F 17/241 |
| 2002/0079143 A1 | 6/2002 | Silverstein et al. | |
| 2002/0158921 A1 | 10/2002 | Silverstein | |
| 2003/0133629 A1 | 7/2003 | Sayers | |
| 2008/0186255 A1 * | 8/2008 | Cohen .................. | G02B 27/017 345/8 |
| 2011/0102605 A1 † | 5/2011 | Hannaford | |
| 2012/0218263 A1 * | 8/2012 | Meier ..................... | G06T 19/00 345/419 |
| 2013/0162665 A1 * | 6/2013 | Lynch .................. | G09B 29/106 345/589 |

(Continued)

OTHER PUBLICATIONS

Michael Rohs et al., "Impact of Item Density on the Utility of Visual Context in Magic Lens Interactions", Pers Ubiquit Comput; 2009, pp. 663-646.

(Continued)

*Primary Examiner* — Sean Motsinger
(74) *Attorney, Agent, or Firm* — Squire Patton Boggs (US) LLP (57) ABSTRACT

According to an example aspect of the present invention, there is provided an apparatus comprising at least one receiver configured to receive sensor information, at least one processing core configured to determine, based at least in part on the sensor information, a position of a device on a physical surface and to obtain or cause obtaining of an image relating to the determined position wherein obtaining the image comprises obtaining static content based on the position of the device on the physical surface and obtaining dynamic content based a virtual space associated with the physical surface.

18 Claims, 5 Drawing Sheets

(56) References Cited

U.S. PATENT DOCUMENTS

2013/0187952 A1* 7/2013 Berkovich ................ G01S 5/16
                                                              345/633
2014/0160162 A1† 6/2014 Balachandreswaran et al.

OTHER PUBLICATIONS

Wendy E. Mackay et al., "The Missing Link: Augmenting Biology Laboratory Notebooks", vol. 4, Issue 2, XP-001171566, 2002, pp. 41-50.

* cited by examiner
† cited by third party

INTERACTIVE PHYSICAL DISPLAY

FIELD OF INVENTION

The present invention relates to the field of display screens and their interactive use.

BACKGROUND OF INVENTION

Photography involves capturing an image of a physical object or scenery. A photograph, which may be digital or chemical in nature, reproduces visual elements visible in the photographed physical object or scenery, for future reference or recollection. Photographs may be printed on paper, which facilitates storage of the images for very long periods of time, or photographs may be stored digitally on hard drives or cloud services, which facilitates easy storage and retrieval of large quantities of photographs.

Maps record geographical or urban features of a landscape, and can be conveniently printed on paper which may be folded to a compact size for easy portability and reference. By consulting a map a person is enabled to discover aspects of her surroundings that may not be obvious by surveying the surroundings visually. Examples of such aspects may include elevation, nearby buildings, nearby streets, public transport connections and municipal or international borders.

Augmented reality comprises that a digital photograph, or live digital video, is furnished with supplementary information that relates to subjects visible in the digital photograph or video. For example, a street view may be furnished with information pointing out interesting architectural aspects of buildings visible in the street view. As another example, a view may be furnished with information on nearby restaurants and directions to reach them.

Augmented reality may be implemented, for example, in a smartphone platform. Such an implementation may work based on a camera on the back of the smartphone, the smartphone being configured to capture a video image of a user's surroundings using the camera and to display it live on a screen disposed in the smartphone on an opposite side with respect to the camera. The user can then pan around and see her surroundings displayed live on the screen. The smartphone may then add to the image on the screen the aforementioned supplementary information to produce the augmented reality view that comprises both the video feed, and overlaid on top of it the supplementary information arranged in a suitable graphical presentation. The user may select which type of supplementary information the smartphone should add, for example in case the user wants to find nearby museums, she can select only museum-related supplementary information to be added to the live depiction of her surroundings.

SUMMARY OF THE INVENTION

According to a first aspect of the present invention, there is provided an apparatus comprising at least one receiver configured to receive sensor information, at least one processing core configured to determine, based at least in part on the sensor information, a position of a device on a physical surface and to obtain or cause obtaining of an image relating to the determined position wherein obtaining the image comprises obtaining static content based on the position of the device on the physical surface and obtaining dynamic content based a virtual space associated with the physical surface.

Various embodiments of the first aspect comprise at least one feature from the following bulleted list:

- the device comprises the apparatus and the device is configured to display the image on a screen comprised in the device, on an opposite side relative to the physical surface
- the device is attachable to the apparatus via a communications connection, and the apparatus is configure to provide the image to the device
- the device is attachable to the apparatus via a connection as an accessory, and the apparatus is configured to cause displaying of the image
- obtaining the image comprises the at least one processing core rendering the image
- obtaining the image comprises the at least one processing core causing a graphics processor to render the image
- the at least one receiver is further configured to receive information defining a touch interaction and the at least one processing core is configured to associate the touch interaction with a dynamic content element comprised in the image
- the at least one processing core is further configured to determine, during the touch interaction, a new a position of the device on the physical surface
- the at least one processing core is further configured to determine, after determining the new position of the device on the physical surface, an end of the touch interaction and to responsively cause an input to be transmitted into the virtual space
- the sensor information comprises at least one of the following: digital camera output data, near-field communication data and low-power radio triangulation data
- the obtained dynamic content is associated with a location in the virtual space that is associated with the position of the device on the physical surface
- the apparatus may be associated with a smart object, and be configured to report a location of itself as a location of the smart object According to a second aspect of the present invention, there is provided a method comprising receiving, in an apparatus, sensor information, determining, based at least in part on the sensor information, a position of a device on a physical surface, obtaining an image relating to the determined position, wherein obtaining the image comprises obtaining static content based on the position of the device on the physical surface and obtaining dynamic content based a virtual space associated with the physical surface.

Various embodiments of the second aspect comprise at least one feature corresponding to a feature in the foregoing bulleted list laid out in connection with the first aspect.

According to a third aspect of the present invention, there is provided an apparatus comprising means for receiving sensor information, means for determining, based at least in part on the sensor information, a position of a device on a physical surface, means for obtaining an image relating to the determined position, wherein obtaining the image comprises obtaining static content based on the position of the device on the physical surface and obtaining dynamic content based a virtual space associated with the physical surface.

According to a fourth aspect of the present invention, there is provided a non-transitory computer readable medium having stored thereon a set of computer readable instructions that, when executed by at least one processor, cause an apparatus to at least receive sensor information, determine, based at least in part on the sensor information, a position of a device on a physical surface, obtain an image relating to the determined position, wherein obtaining the image comprises obtaining static content based on the position of the device on the physical surface and obtaining dynamic content based a virtual space associated with the physical surface.

INDUSTRIAL APPLICABILITY

At least some embodiments of the present invention find industrial application in managing display screens, for example allowing selection of a smaller display screen size.

DETAILED DESCRIPTION OF EXAMPLE EMBODIMENTS

Using a device with a display together with a physical surface allows a user to selectively view sections of a virtual space that is associated with the physical surface. This allows use of a smaller display screen and less processing power, since the entire virtual space needn't be rendered and displayed at the same time. Physically interacting with the physical surface by placing the device on it increases a sense of immersion in the virtual space. In general a virtual space may comprise a digital representation of a metric space that is capable of containing therein virtual space elements. Virtual space elements may comprise digital representations comprising at least one characteristic. Virtual space elements may be disposed at specific locations in a virtual space. Some virtual space elements are able to move in the virtual space.

Figure 1:
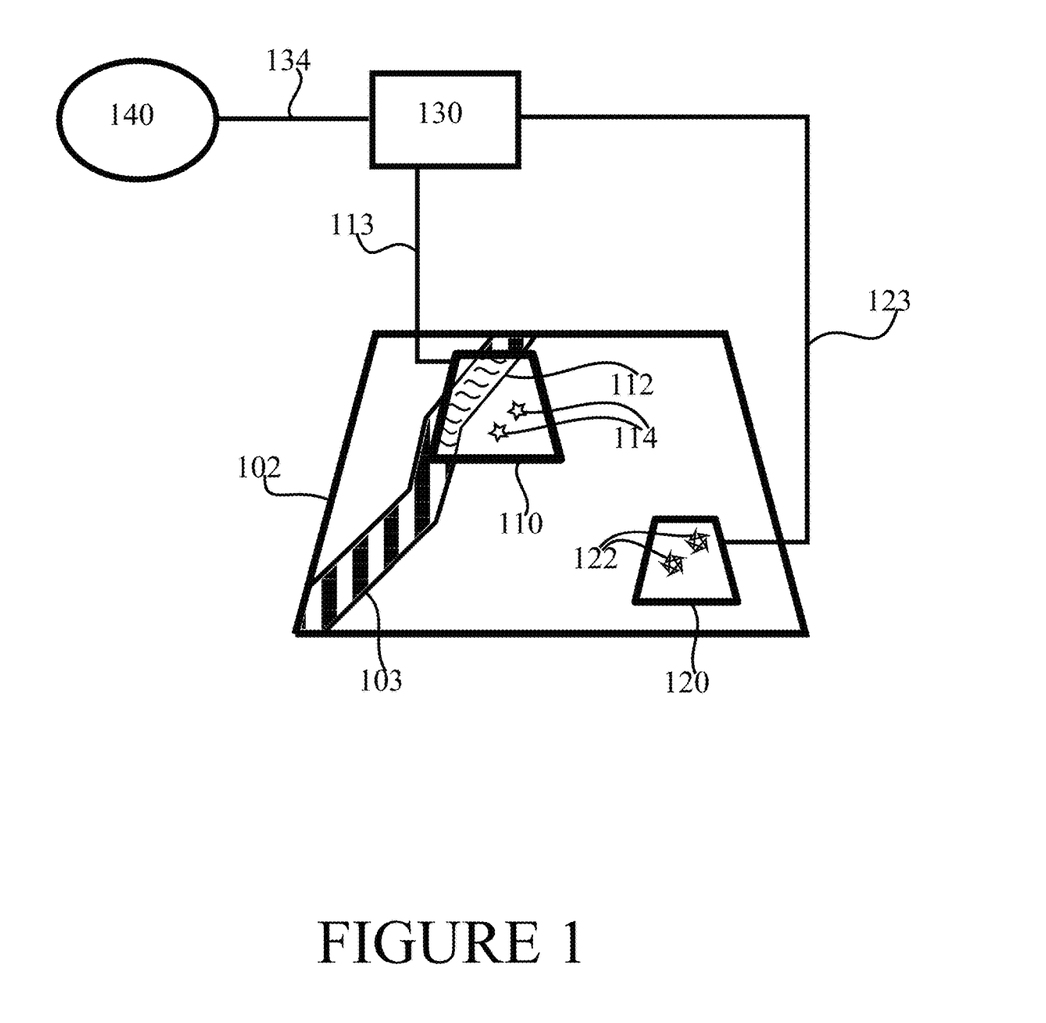
FIG. 1 illustrates an example system capable of supporting at least some embodiments of the present invention.

FIG. 1 illustrates an example system capable of supporting at least some embodiments of the present invention. Physical surface 102 comprises printed thereon a static feature 103. A static feature may comprise, for example a river, a floor plan of a factory, a floor plan of a department store or an image on a page of a book. Physical surface 102 may comprise printed thereon more than one static feature. Physical surface 102 may be foldable.

Device 110 is illustrated in FIG. 1 as disposed on physical surface, which may comprise, for example, that device 110 rests on physical surface 102, being pulled against it by gravity, with physical surface 102 in turn resting on a suitable support, which is not illustrated in FIG. 1. Device 110 comprises a display on a side of device 110 that does not face physical surface 102. For example, the display may form part of one face of device 110. Device 110 may comprise tablet device, a smartphone or phablet device, or another kind of suitable device. Device 110 may comprise a foldable display to facilitate portability. An example of a foldable display is an ink display manufactured by E-ink Corporation.

Disposed on physical surface 102 is also further device 120, which similarly to device 110 comprises a display on a side that does not face physical surface 102.

Device 110 is in communication with computer 130 via connection 113, and device 120 is in communication with computer 130 via connection 123. Connections 113 and 123 may be wire-line connections, such as Ethernet connections, or they may be at least in part wireless connections, such as Wi-Fi or Bluetooth connections, for example. Computer 130 in turn may be connected, via connection 134, to network 140. In some embodiments, network 140 is absent.

Device 110 may be configured to determine where on physical surface 102 it is located. To such end, device 110 may comprise, on a reverse side with respect to the display, that is, on the side facing physical surface 102, a camera that is arranged to image the underlying physical surface 102. Physical surface 102 may comprise printed thereon a predetermined dot, micro-dot, barcode or other suitable pattern the camera is able to detect, and device 110 may be furnished with a mapping from the pattern to a location on physical surface 102. In addition to location, an orientation of device 110 on physical surface 102 may be determinable based on the pattern, for example where device 110 is arranged such that its long side is at an angle with respect to a certain side of physical surface 102, this may be determined by device 110.

Alternatively, or in addition, to a camera, device 110 may employ a different kind of sensor unit to obtain sensor information enabling the determination of the location and/or orientation of device 110 on physical surface 102. For example, device 110 may comprise a near-field communication, NFC, sensor configured to detect NFC tags implanted in physical surface 102. For example, sensors may detect low-power radio beacons arranged in or about physical surface 102. Camera data and NFC sensing data are examples of sensor information. Sensor information may be processed to compress it, or to improve its usability for determining the location and/or orientation of device 110 on physical surface 102. Processed sensor information may also be referred to as sensor information in that it is information originating in at least one sensor, processed or otherwise. Likewise to device 110, device 120 may be configured to determine its location and/or orientation on physical surface 102.

Based in part on the determined location and/or orientation of device 110 on physical surface 102, device 110 may be configured to obtain an image for displaying on the display comprised in device 110. The obtained image may comprise two kinds of content, static content based on the position and/or orientation of the device on the physical surface and dynamic content based a virtual space associated with the physical surface.

Static content comprising a representation of a static feature 103 imprinted on physical surface 102 may be included in the image in case a display of device 110 is determined, based on the location and/or orientation of device 110 on physical surface 102, to cover, at least in part, static feature 103.

As an example of static content, where device 110 rests on physical surface 102 so that the display comprised in device 110 at least partly covers a river which is printed as a static feature 103 on physical surface 102, the image may comprise a representation of the river 112. The representation 112 may be more detailed than what is printed as a static feature on physical surface, and/or representation 112 may be animated, for example there may be wave patterns in representation 112.

As an example of dynamic content, tokens 114 may be included in the image. Tokens 114 may be included in the image based on a mapping between physical surface 102 and a virtual space, wherein physical surface 102 corresponds, via the mapping, to at least part of the virtual space. In other words, tokens 114 may represent elements present in the virtual space and their inclusion in the image occurs as a response to a determination the elements they represent are present in a location of the virtual space that corresponds, via the mapping, to a part of physical surface 102 that the display comprised in device 110 covers.

As an example of dynamic content, a token 114 may comprise a closed-circuit tv, CCTV, image present in the virtual space. In this example, physical surface 102 may comprise a floor plan or layout of a factory, and by placing device 110 on a section of the layout, a worker can see the dynamic content comprising a live feed from a CCTV camera at that part of the factory. As a further example, dynamic content may comprise current, dynamically updated process parameters of a section of an industrial process. A user can place device 110 on the desired part of physical surface 102, guided by static features 103, to see the dynamic content associated with that part of the process.

The image may be obtained by rendering it based on the static and/or dynamic content, either using a general-purpose processor or a graphics processor or co-processor of device 110.

The virtual space may affect the way static content is rendered in the image, for example if it is night-time in the virtual space, a static content element may be rendered as a low-light version. Thus in general the presence of static content in the image depends on the location and/or orientation of device 110, but the manner of its rendering may be dependent, at least in part, on parameters comprised in the virtual space.

The virtual space may be maintained in device 110, computer 130 or in network 140, for example. The virtual space may be a cloud service accessible to one or more than one user. For example, there may exist a plurality of physical surfaces, and device 110 and similar devices placed on other physical surfaces than physical surface 102 may request from an entity maintaining the virtual space the dynamic content relevant to sections of the virtual space. Each such request may comprise information defining a section of a physical surface, such as for example a section the device's display covers, or alternatively a section of the virtual space corresponding, via the mapping, to the section of the physical surface the device's display covers. Alternatively, such requests may comprise information defining a section of a physical surface the sensor information describes.

Like device 110, device 120 may be configured to obtain an image representing dynamic and/or static content. In case device 120 is on a section of physical surface 102 that does not have static features, the image obtained in device 120 may comprise only dynamic content, such as icons 122. Analogously to the case of device 110, dynamic content in the image obtained in device 120 is comprised in a section of the virtual space that corresponds, via the mapping, to a part of physical surface 102 that is covered by a display comprised in device 120.

In general, the obtained image may comprise the static content aligned taking into account the orientation of device 110 or device 120. In other words, the static content may be displayed oriented so as to be aligned with corresponding static features 103 on physical surface 102. For example, in FIG. 1 the static content of river 112 is aligned with the river static feature 103 that it represents. This may improve the usability of the system, as users can intuitively align their devices and receive feedback on the orientation that is logical.

Where the display of device 110 comprises a touchscreen display, a user may interact with dynamic content elements by touching one, such as for example token 114. By touching a part of the touchscreen displaying token 114, a context menu may be triggered, wherein the menu may be displayed on the display. The menu may comprise actions that may be triggered relating to the touched token 114. For example, where the token represents a cell phone of a person currently present in a location that is mapped to the part of the virtual space that corresponds to the point on physical surface 102 the token 114 is displayed on, a context menu associated with this token 114 may comprise as a possible action placing a call to this cell phone, or sending a text message to it. Alternatively, where the token 114 corresponds to an industrial process parameter, the context menu may comprise as possible actions starting a part of the industrial process, or modifying a speed, temperature or other aspect of it. Touching icon 122 may trigger a context menu concerning the touched icon 122. In general interacting with a dynamic content item may trigger a context menu. The context menu may comprise elements specific to a type of the touched dynamic content item. The context menu may comprise elements specific to the specific touched dynamic content item. An example of interacting with a dynamic content item is touching the dynamic content item.

Device 110 may be configured to provide indications of user interactions with dynamic content elements to an element maintaining the virtual space, in case device 110 does not maintain the virtual space itself.

While in the foregoing it is described that device 110 is configured to determine its location and/or orientation on physical surface 102, in some embodiments device 110 is configured to provide to computer 130 sensor information obtained by device 110 of physical surface 102, to enable computer 130 to determine the location and/or orientation of device 110 on physical surface 102. In such embodiments, computer 130 may also be configured to obtain the image and to provide it to device 110, or alternatively computer 130 may be configured to provide information specifying the location and/or orientation of device 110 on physical surface 102 to device 110, to enable device 110 to obtain the image. In case the display is an external unit connected to device 110, device 110 may be configured to provide the image to the display, or the image may be provided directly to the display.

In some embodiments, device 110 is not in itself capable of obtaining the sensor information usable in determining its location on physical surface 102. In these embodiments, device 110 may be furnished with an accessory sensor device, such as for example a camera unit designed to capture close-up images of physical surface 102. Such an accessory unit may be plugged into a suitable connector of device 110, so that the orientation of the accessory with respect to device 110 becomes known. This in turn may enable determining the orientation of device 110 from the orientation of the accessory. The orientation of the accessory on physical surface 102 may be determined based on the sensor information sensed by the accessory. To enable use of different kinds of devices, an entity maintaining the virtual space may have a database of device type identifiers which it may use to determine the orientation of the device from the orientation of the accessory. Suitable device types may include, for example, smartphones, phablets or tablet devices.

Device may carry a smart object. In general, device 11 may be associated with a smart object, wherein carrying the smart object is an example of association. Another example of association is where the smart object is placed inside device 110. To enable this, device 110 may comprise a cavity large enough to receive the smart object. Device 110 may be configured to report to computer 130 the location of device 110 on ther surface and/or in the virtual space as a location of the smart object. A user may associate a smart object with a device, to cause a corresponding association to occur in the virtual space. This may be useful to effect changes in the virtual space, for example where the smart object is associated with a "camera", or point-of-view in the virtual space, so the user may obtain views into a virtual space from within the virtual space. This may be useful when visualizing results of medical imaging or architectural models, for example. Associating may also be useful where the virtual space represents a file system, and the smart object is a security key unlocking access rights to a subset of files in the file system. For example, device 110 may only be allowed to interact with these files when device 110 is associated with the smart object. The smart object may comprise a cryptographic token.

A smart object may comprise a physical object with associated information. The associated information may comprise at least one of an identity of the smart object, an identity of a virtual space element corresponding to the smart object and characteristics of the virtual space element corresponding to the smart object. A smart object may be usable in interacting with elements, such as for example files, models or games, in the virtual space.

In some embodiments, device 110 may represent a helicopter or ship in the virtual space, which in these embodiments is a game. The smart object may in such embodiments represent a character or unit not capable of moving in certain sections of the virtual space unless "loaded" into another device via an association. For example, a tank may be transported over an ocean in the virtual space game when loaded into a ship. To achieve this, device 110, representing the ship in the virtual space, may comprise information that may be read by smart object 110, representing the tank, so that it is known by the smart object that it is associated with device 110, and it is known by device 110 that it is associated with the smart object, and the virtual space may be informed accordingly that the ship is carrying the tank. Thereafter, when device 110 moves, the ship will move in the virtual space carrying the tank with it as long as the association between device 110 and the smart object endures.

Figure 2:
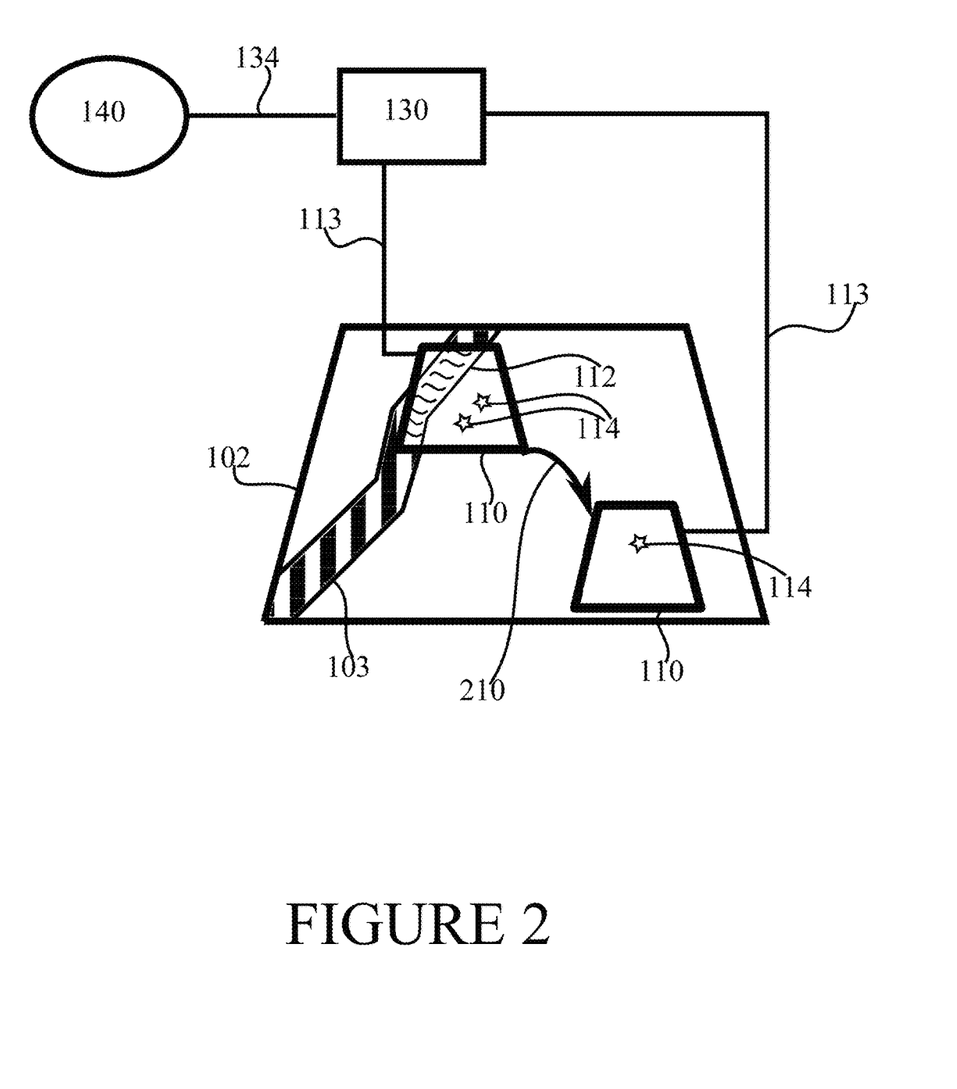
FIG. 2 illustrates an example system capable of supporting an example use interaction of the present invention.

FIG. 2 illustrates an example system capable of supporting an example use interaction of the present invention. Like reference signs denote like structure as in FIG. 1. In FIG. 2 is illustrates only one device, device 110, in two locations on physical surface 102. Arrow 210 denotes movement of device 110 from its first location to its second location. As can be seen from FIG. 2, at its first location the display of device 110 partly covers static feature 203, and the image displayed by device 110 correspondingly comprises static content 112 representing static feature 103. For the functioning of the example use interaction, the presence of static content 112 is optional.

To initiate the use interaction of FIG. 2, a user may touch a token 114 on the display of device 110 when device 110 is in its first location on physical surface 102. The touched token may change in visual appearance to indicate the touch has been successful. Without interrupting the touch of the touched token, the user may move device 110 to its second location on physical surface 102, which is illustrated with arrow 210. Optionally, the user may also, without interrupting the touch, use the touch to drag the token 114 to another part of the display of device 110, before lifting her finger from the display, thus interrupting the touch. While device 110 moves along the physical surface, the image displayed by it may be, optionally, dynamically updated along the way to account for the movement. The user may also, or alternatively, move device 110 from its first location to its second location by lifting device 110 from the physical surface and laying it once more down on the physical surface 102, this time at the second location, all the time without interrupting the touch interaction.

The use interaction described herein in connection with FIG. 2 may be used to input an instruction to the virtual space associated with physical surface 102, namely the element in the virtual space may be given an instruction to move, in particular to the place indicated by the interruption of the touch interaction. In case in the virtual space movement takes time, the user may see, on the display of device 110, the element on its way to the new location after the touch interaction is interrupted. For example, where the move instruction is sent to a human whose position is represented by the token 114 in the virtual space, the user may see the representation of the human's location move toward the new location as the human moves toward the indicated location. A human may be thus instructed to move to a new location in a factory or a ship, for example. Locations in the factory or ship, respectively, may be linked to locations in the virtual space which correspond, via the mapping, to locations on physical surface 102. Where token 114 corresponds to a non-human entity, an artificial intelligence path-finding algorithm may be employed in deciding which path the virtual space element will take to the new location. In addition to, or alternatively to, touch interactions with the display, a use interaction may be triggered by other means of use interactions such as for example a spoken command, a hovering instruction, detection of user's brain activity, a press of a physical button or a combination of the such interactions.

Figure 3:
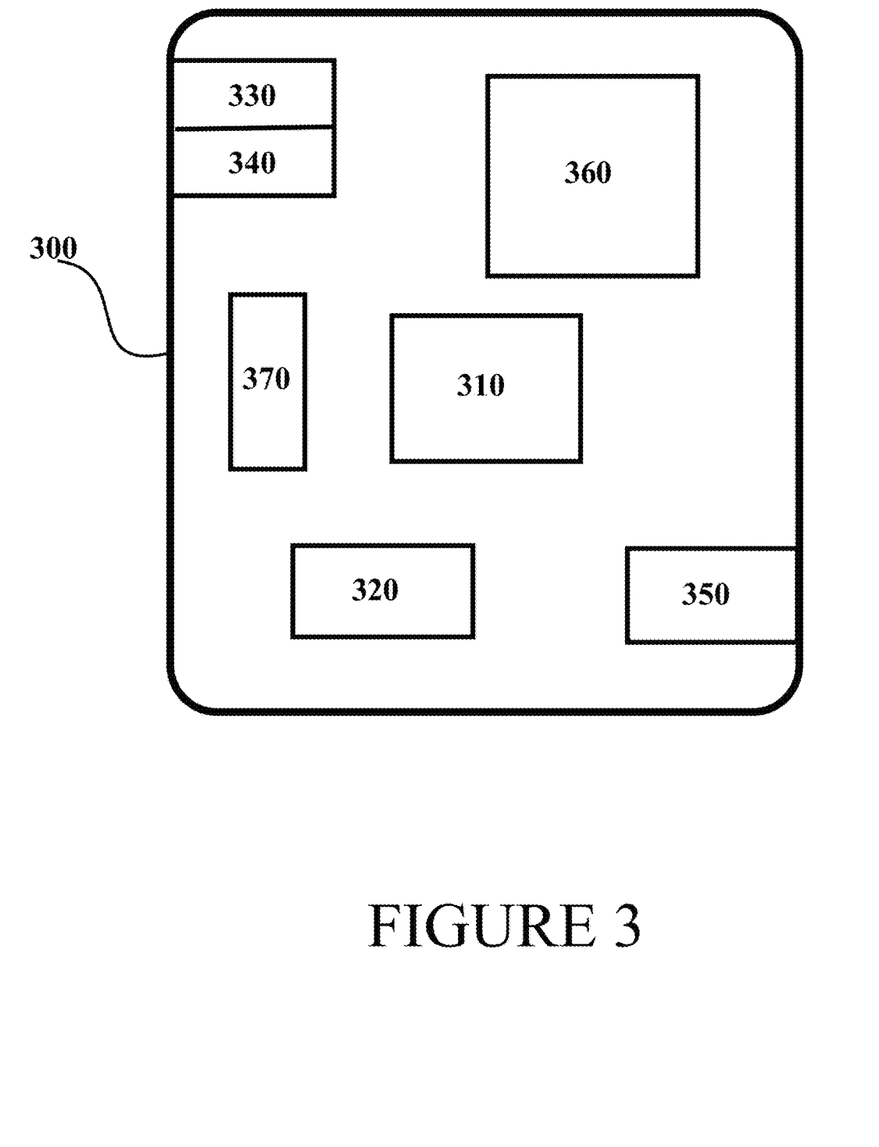
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device such as device 110 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example. WLAN is also known as Wi-Fi Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to interact with a virtual space, place telephone calls and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
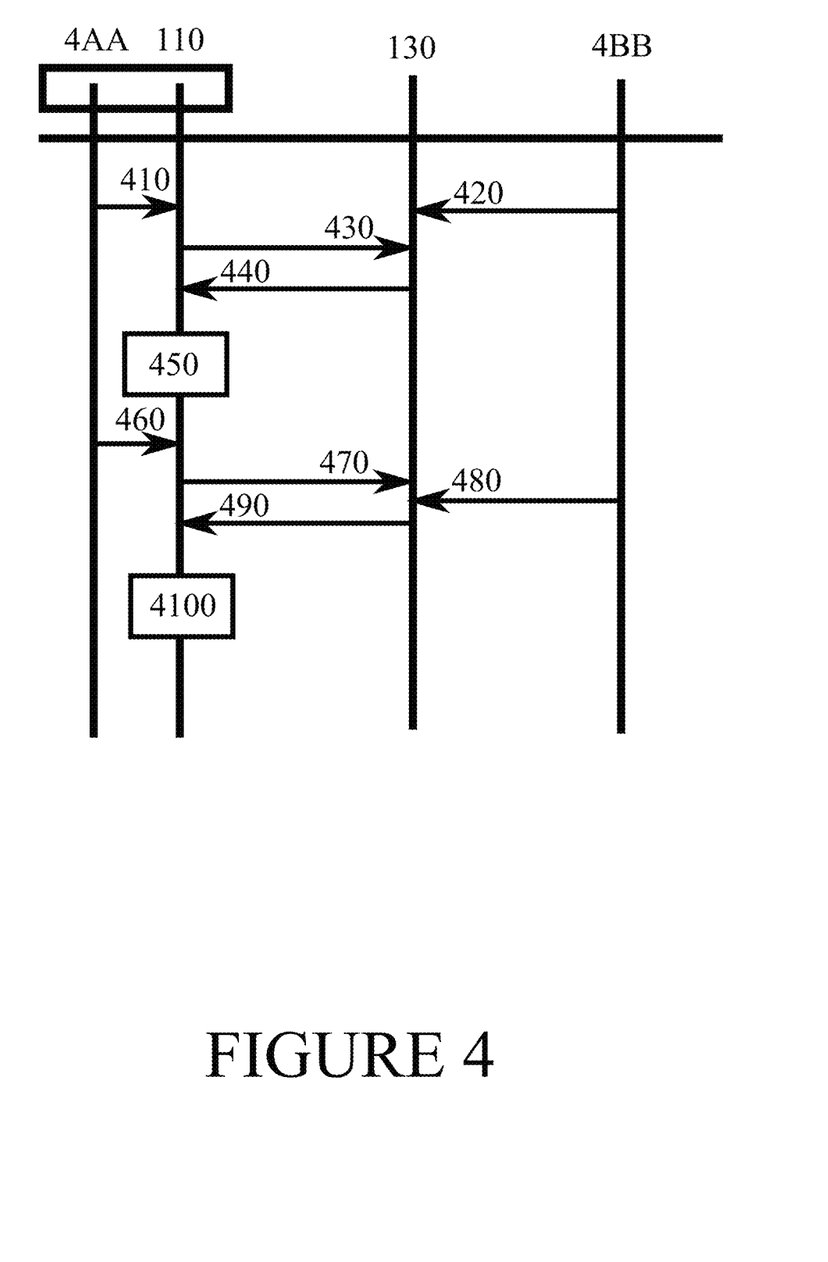
FIG. 4 is a signalling diagram illustrating signalling in accordance with at least some embodiments of the present invention.

FIG. 4 is a signalling diagram illustrating signalling in accordance with at least some embodiments of the present invention. On the vertical axes are disposed, from left to right, sensor module 4AA, device 110, computer 130 and virtual space participant 4BB. Virtual space participant 4BB may comprise device 120 of FIG. 1, for example. Sensor module 4AA may be comprised in device 110, or it may be attached to device 110 as an accessory. Time advances from top to bottom.

In phase 410, sensor module 4AA provides sensor information to device 110. The sensor information may comprise, as described above, camera or NFC information, for example. In phase 420, virtual space participant 4BB interacts with computer 130, which is tasked with maintaining the virtual space. For example, virtual space participant 4BB may interact with an element comprised in the virtual space.

In phase 430, device 110 requests from computer 130 information concerning a location in the virtual space that corresponds, via a mapping, to a location on a physical surface that device 110 is on, and in phase 440 computer 130 responsively provides the requested information. The information may comprise, for example, information on virtual space elements.

In phase 450, device 110 renders an image based at least in part on the information received in phase 440, and/or information on static features of the physical surface device 110 is on. Such rendering is described above. The rendered image may comprise static and/or dynamic content as described above.

In phase 460, new sensor information is provided by sensor module 4AA, reflecting movement of device 110 on the physical surface to a new location and/or orientation. Responsively, device 110 requests, phase 470, and receives, phase 490, information concerning a new location in the virtual space that corresponds to the new location and/or orientation of device 110 on the physical surface. Virtual space participant 4BB interacts with computer 130 once more with computer 130 in phase 480.

In phase 4100 device 110 re-renders the image to reflect the new location and/or orientation of device 110 on the physical surface, and also the interaction of virtual space participant 4BB with the virtual space in phase 480, in case this is visible in the new location and/or orientation of device 110.

Figure 5:
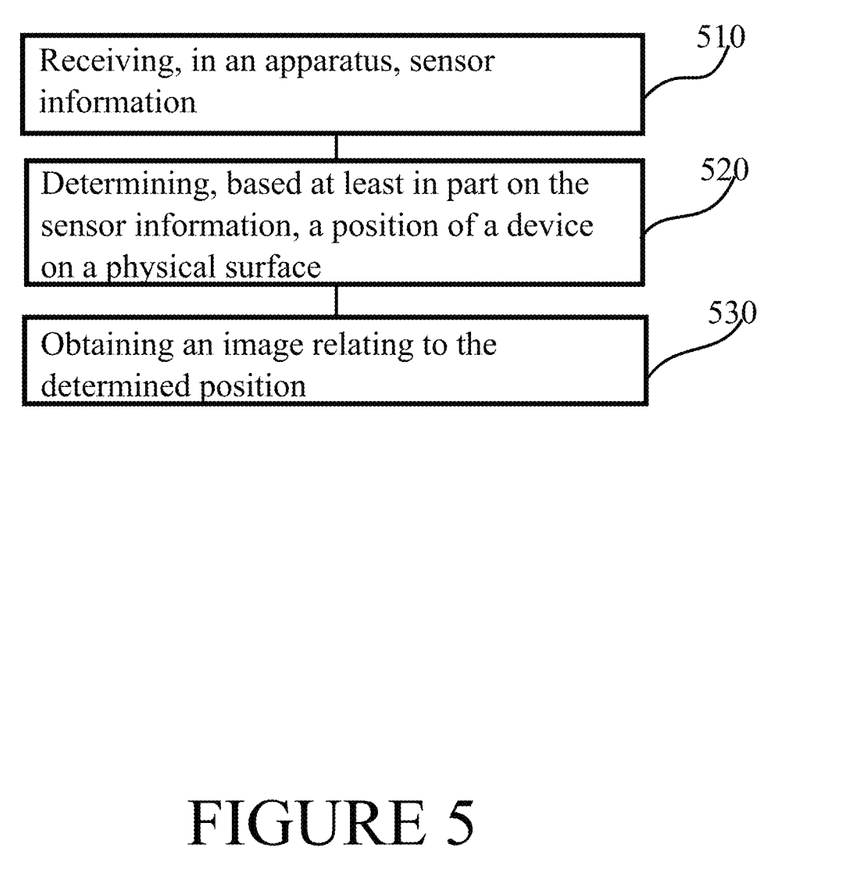
FIG. 5 is a flow chart of a method in accordance with at least some embodiments of the present invention.

FIG. 5 is a flow chart of a method in accordance with at least some embodiments of the present invention. The phases of the illustrated method may be performed in device 110, for example.

Phase 510 comprises receiving, in an apparatus, sensor information. Phase 520 comprises determining, based at least in part on the sensor information, a position of a device on a physical surface. Phase 530 comprises obtaining an image relating to the determined position. Obtaining the image may comprise obtaining static content based on the position of the device on the physical surface and obtaining dynamic content based a virtual space associated with the physical surface.

In general there is provided an apparatus comprising at least one receiver configured to receive sensor information, at least one processing core configured to determine, based at least in part on the sensor information, a position of a device on a physical surface and to obtain or cause obtaining of an image relating to the determined position wherein obtaining the image comprises obtaining static content based on the position of the device on the physical surface and obtaining dynamic content based a virtual space associated with the physical surface. Obtaining the image may comprise rendering, by the apparatus, the image. Obtaining the image may comprise the at least one processing core causing the image to be rendered in a graphics processor comprised in the device.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
at least one receiver configured to receive sensor information; and
at least one processing core configured to determine, based at least in part on the sensor information, a position of the apparatus with regard to a physical surface and to obtain or cause obtaining of a second image relating to the determined position, wherein a first image is located on the physical surface,
wherein obtaining the second image comprises obtaining static content based on the position of the apparatus with regard to the physical surface and obtaining dynamic content based on a virtual space associated with the physical surface, wherein the dynamic content comprises current, dynamically updating data,
wherein the apparatus is configured to display the second image on a screen comprised in the apparatus, on an opposite side relative to the physical surface,
wherein the screen obstructs a first portion of the first image, the first portion being less than an entirety of the first image,
wherein based on the first portion a second portion of the first image is determined to display the static content in the second image,
wherein the second image displayed on the screen comprises both the static content and the dynamic content, and
wherein the displaying of the static content depends on a parameter within the virtual space.

2. The apparatus according to claim 1, wherein the apparatus is attachable to a device via a communications connection, and the apparatus is configured to provide the second image to the device.

3. The apparatus according to claim 1, wherein the apparatus is attachable to a device via a connection as an accessory, and the apparatus is configured to cause displaying of the second image.

4. The apparatus according to claim 1, wherein obtaining the second image comprises the at least one processing core rendering the second image.

5. The apparatus according to claim 1, wherein obtaining the second image comprises the at least one processing core causing a graphics processor to render the second image.

6. The apparatus according to claim 1, wherein the at least one receiver is further configured to receive information defining a touch interaction and the at least one processing core is configured to associate the touch interaction with a dynamic content element comprised in the second image.

7. The apparatus according to claim 6, wherein the at least one processing core is further configured to determine, during the touch interaction, a new a position of the apparatus on the physical surface.

8. The apparatus according to claim 7, wherein the at least one processing core is further configured to determine, after determining the new position of the apparatus with regard to the physical surface, an end of the touch interaction and to responsively cause an input to be transmitted into the virtual space.

9. A method comprising:
receiving, in an apparatus, sensor information;

determining, based at least in part on the sensor information, a position of an apparatus with regard to a physical surface, wherein a first image is located on the physical surface;

obtaining a second image relating to the determined position, wherein obtaining the second image comprises obtaining static content based on the position of the apparatus with regard to the physical surface and obtaining dynamic content based on a virtual space associated with the physical surface, wherein the dynamic content comprises current, dynamically updating data wherein the device comprises the apparatus; and displaying, by the apparatus, the second image on a screen comprised in the apparatus, on an opposite side relative to the physical surface, wherein the screen obstructs a first portion of the first image, the first portion being less than an entirety of the first image, wherein based on the first portion a second portion of the first image is determined to display the static content in the second image, wherein the second image displayed on the screen comprises both the static content and the dynamic content, and wherein the displaying of the static content depends on a parameter within the virtual space.

10. The method according to claim 9, wherein the apparatus is attachable to a device via a communications connection, and wherein the method further comprises providing, by the apparatus, the second image to the device.

11. The method according to claim 9, wherein the apparatus is attachable to a device via a connection as an accessory and the method further comprises the causing, by the apparatus, displaying of the second image.

12. The method according to claim 9, wherein obtaining the second image comprises rendering the second image or causing a graphics processor to render the second image.

13. The method according to claim 9, further comprising receiving information defining a touch interaction and associating the touch interaction with a dynamic content element comprised in the second image.

14. The method according to claim 13, further comprising determining, during the touch interaction, a new a position of the apparatus with regard to the physical surface and determining, after determining the new position of the apparatus with regard to the physical surface, an end of the touch interaction and responsively causing an input to be transmitted into the virtual space.

15. The method according to claim 9, wherein the sensor information comprises at least one of the following: digital camera output data, near-field communication data and low-power radio triangulation data.

16. The method according to claim 9, wherein the obtained dynamic content is associated with a location in the virtual space that is associated with the position of the apparatus with regard to the physical surface.

17. The method according to claim 9, further comprising modifying a first dynamic content element comprised in the second image responsive to a touch interaction on the first dynamic content element.

18. A non-transitory computer readable medium having stored thereon a set of computer readable instructions that, when executed by at least one processor, cause an apparatus to at least:

receive sensor information;

determine, based at least in part on the sensor information, a position of the apparatus with regard to a physical surface, wherein a first image is located on the physical surface; and obtain a second image relating to the determined position, wherein obtaining the second image comprises obtaining static content based on the position of the apparatus with regard to the physical surface and obtaining dynamic content based on a virtual space associated with the physical surface, wherein the dynamic content comprises current, dynamically updating data, wherein the apparatus is configured to display the second image on a screen comprised in the apparatus, on an opposite side relative to the physical surface, wherein the screen obstructs a first portion of the first image, the first portion being less than an entirety of the first image, wherein based on the first portion a second portion of the first image is determined to display the static content in the second image, wherein the second image displayed on the screen comprises both the static content and the dynamic content, and wherein the displaying of the static content depends on a parameter within the virtual space.

\* \* \* \* \*